No. 814,250. PATENTED MAR. 6, 1906.
H. W. TOLER.
FRUIT CANNER.
APPLICATION FILED AUG. 18, 1905.
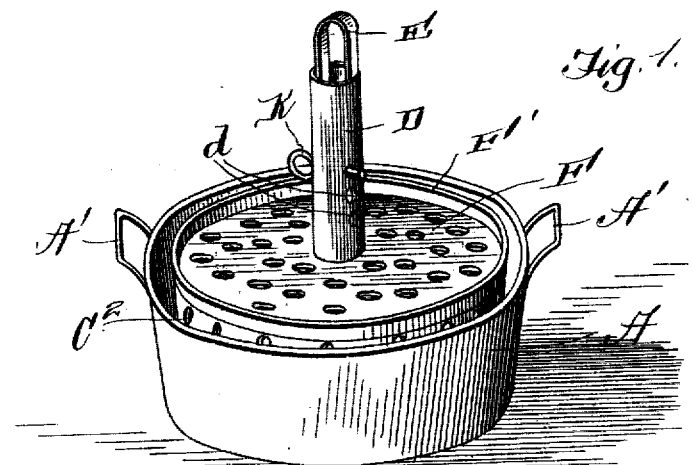
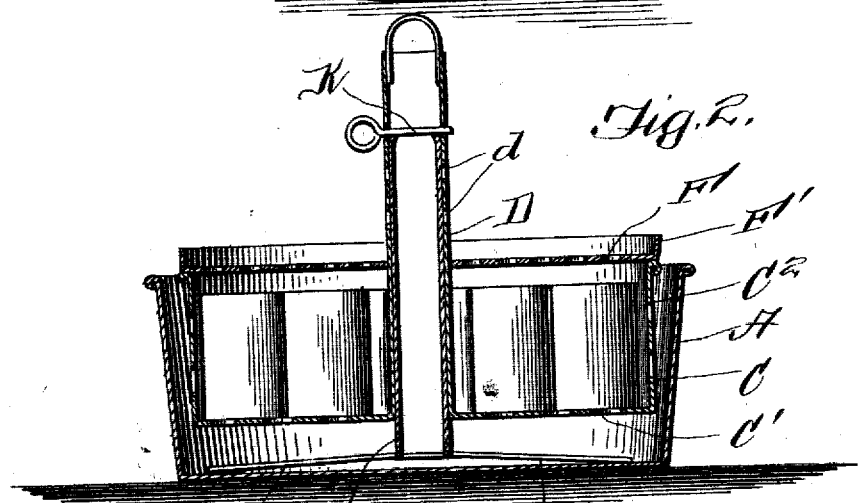
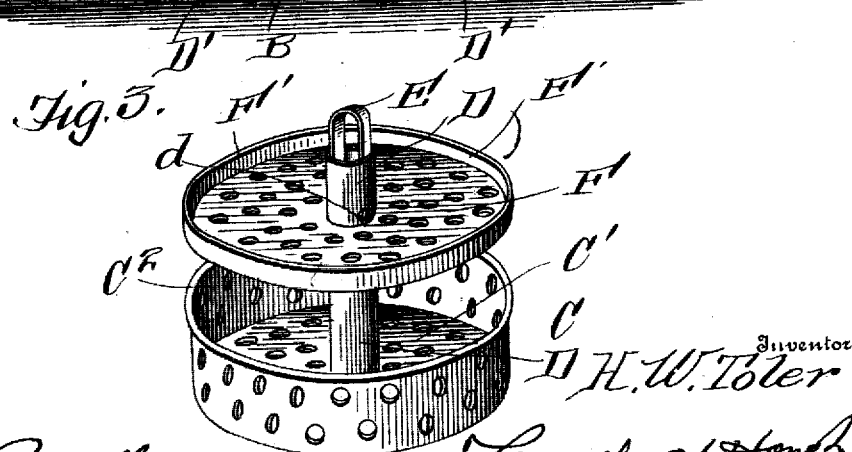
Inventor
H. W. Toler
Witnesses
R. A. Boswell
A. L. Hough
By Franklin N. Hough
Attorney

UNITED STATES PATENT OFFICE.

HENRY WILSON TOLER, OF LONGVIEW, TEXAS.

FRUIT-CANNER.

No. 814,250.

Specification of Letters Patent.

Patented March 6, 1906.

Application filed August 18, 1905. Serial No. 274,782.

*To all whom it may concern:*

Be it known that I, HENRY WILSON TOLER, a citizen of the United States, residing at Longview, in the county of Gregg and State of Texas, have invented certain new and useful Improvements in Fruit-Canners; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fruit-canning apparatus; and the object of the invention is to produce a simple and efficient means whereby a plurality of cans may be held in a suitable perforated tray and placed in a receptacle whereby the cans may be heated to the required temperature and easily removed therefrom.

The invention comprises various details of construction and combinations and arrangements of parts, as will be hereinafter fully described and then specifically defined in the appended claims.

I illustrate my invention in the accompanying drawings, in which—

Figure 1 is a perspective view of my improved fruit-canner. Fig. 2 is a sectional view through the parts of the apparatus, and Fig. 3 is a detail perspective view of a portion of the invention.

Reference now being had to the details of the drawings by letter, A designates a receptacle of any suitable shape or construction provided with handles A', and B designates a hollow tubular post having radial arms D' secured to its lower end, which arms are fastened to the bottom of the tub A.

C designates a tray having a perforated bottom C' and flange C², and D designates a hollow tubular member rising from a central aperture in the bottom of the tray and is of slightly larger diameter than the post B, over which it telescopes when the tray is positioned in the receptacle in readiness for heating up the contents of the cans which are placed within said tray.

E designates an eye or loop which is fastened to the tubular member D, whereby the tray, with its contents, may be conveniently raised out of the receptacle A or lowered therein by means of any suitable appliance.

F designates a perforated disk having a flanged edge F' and centrally apertured to receive the tubular member D. Said disk F is adapted to rest upon the flanged edge of the tray C and is provided as an exhauster upon which the cans after they are filled with fruit and before being sealed up are placed, and after the air has been drawn off the cans they are sealed and lowered into the tray for the cooking process of the contents thereof. Said tubular member D has a series of perforations *d* therein, through which a pin K is adapted to be inserted, said pin resting upon the top of the tubular member D to regulate the height at which it is desired the tray to be held.

From the foregoing it will be noted that a simple and efficient apparatus is provided for use in canning fruit and affording means whereby the tray containing the cans may be easily and quickly lowered into or removed from the receptacle.

Having thus fully described my invention, what I claim as new, and desire to secure by Letters Patent, is—

1. A fruit-canning apparatus comprising a receptacle, a post rising therefrom and secured to said receptacle, a tray having a hollow circular member adapted to telescope over said post, means for holding said tray at different heights within the receptacle, a perforated disk having a central aperture to receive said member and adapted to rest upon the flange of said tray, and a loop carried by said member, as set forth.

2. An apparatus for canning fruit comprising a receptacle, a post, radial arms fixed to the bottom of said post and fastened to said receptacle, a flanged perforated tray, a hollow tubular member fastened in an aperture in the bottom of said tray and adapted to telescope over said post, means for holding the tray at different heights, and a perforated disk telescoping over said member and adapted to rest upon the flange of said tray, as set forth.

In testimony whereof I hereunto affix my signature in the presence of two witnesses

HENRY WILSON TOLER.

Witnesses:
J. M. HOSKINS,
J. J. BUTTS.